Feb. 9, 1932.  S. B. SMITH  1,844,412

SEALING RING

Filed Sept. 3, 1930

INVENTOR
SAMUEL B. SMITH

BY
Ely & Barrow
ATTORNEYS

Patented Feb. 9, 1932

1,844,412

UNITED STATES PATENT OFFICE

SAMUEL B. SMITH, OF ROCKY RIVER, OHIO

SEALING RING

Application filed September 3, 1930. Serial No. 479,519.

The present invention relates to the construction of expansible metal sealing rings such as used for example on pistons or the like for providing a tight sealing fit between moving parts. The invention has for its object the devising of a new form of sealing or piston ring which operates upon a new and different principle from prior sealing rings. It is the purpose of the invention to provide an expansible ring which shall form an effective seal, and shall prevent the escape of pressure around or through the ring.

In certain types of engines extremely high pressures are developed, and it is the aim of the present invention to provide an expansible ring in which means is provided effectively to seal the joint in the ring so that the maximum sealing will be secured. The result is secured in a simple and inexpensive construction which adequately seals the space or point of exit around and about the ring in the groove in which the ring is seated.

For the purposes of illustration a simple piston ring installation is illustrated and will be described, but it will be observed that the invention may be employed wherever sealing rings are required. It will also be apparent that the invention is not limited to exact conformity with the details as shown, but may be modified or improved within the scope of the claims.

Figure 1:
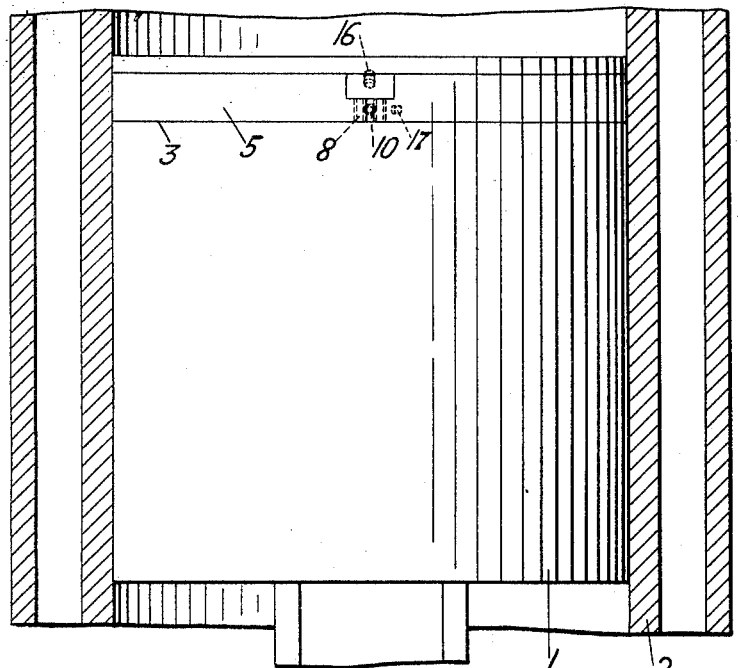
Figure 1 is a side elevation of a piston equipped with the improved sealing ring, the cylinder being shown in section.
Figure 2:
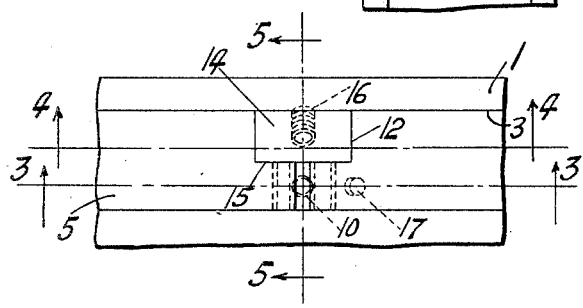
Figure 2 is an enlarged side view of a ring at the joint.
Figure 3:
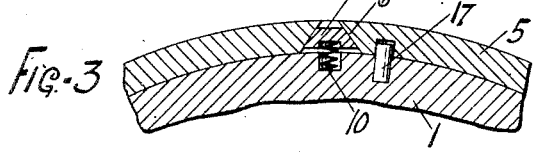
Figure 3 is a section on the line 3—3 of Figure 2.
Figure 5:
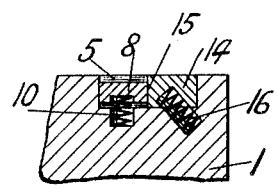
Figure 5 is a section on the line 5—5 of Figure 2.
Figure 4:
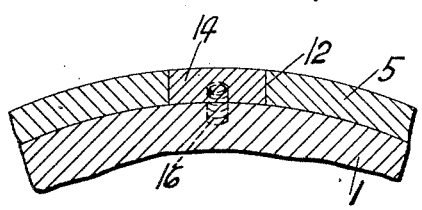
Figure 4 is a section on the line 4—4 of Figure 2.

In the drawings the numeral 1 represents a usual piston operating in the cylinder 2, and provided with a piston ring groove 3.

In the groove is seated the split, expansible, spring sealing or piston ring 5. As shown in the drawings, this ring is provided with a peculiarly formed gap or split. In its lower portion the ring is split in the form of a V or outwardly tapering split or gap 6 in which is located the correspondingly tapered wedge or V-shaped block or key 8 of the same depth as the split. The key is forced outwardly against the converging walls by means of a coil spring 10 seated in a recess in the piston. Although the ring is normally expansible of its own resilience or springy qualities, the wedge shaped block or key serves to force it out more firmly in contact with the inner wall of the cylinder, and also serves to seal the split in the ring.

It will be noted, however, that passages are necessarily present on either side of the tapering key, and it is necessary to seal these passages in order to secure the most effective seal. For this purpose, directly above the split 6 the ring is cut away to provide a substantially segmental recess 12 in which is located the correspondingly shaped block or seal 14. This block, which is located next to the explosion side of the piston, is pressed against the sealing face 15 and also against the inner wall of cylinder 2 by the diagonally positioned coil spring 16, in this way taking up the wear on the outside of block 14 and also forcing the block 14 against the seat 15. A pin 17 located in the piston near the gap 6 prevents rotation of the piston ring 5 in the groove 3.

In operation, the ring is expanded against the inner surface of the cylinder by the tapered key and the spaces about the tapered key are sealed in turn by the block 14. In this manner an effective seal is provided which prevents leakage of the pressure through the sealing ring. This affords a more perfect seal than has been possible with previous designs of sealing rings.

What is claimed is:

1. A sealing device comprising a split expansible sealing ring and filler blocks located in the gap in the ring, one of said blocks being spring pressed radially outwardly to expand the ring, the second block being spring pressed axially of the ring to seal the spaces about the first named block.

2. A sealing device comprising a split expansible sealing ring, the gap in said ring being provided with outwardly converging walls, a key located between the walls and operative to expand the ring, and a block also located in the gap in the ring and operative to seal the spaces about the key.

3. A sealing device comprising a split expansible sealing ring, the gap in said ring being provided with outwardly converging walls, a key located between the walls and operatively to expand the ring, and separate means associated with the ring to cover the gap in which the key is located.

4. A sealing device comprising a split expansible sealing ring, means to expand the ring located in the gap in the ring, in combination with a separate block located in alignment with and overlying the gap.

5. A sealing device comprising a split expansible sealing ring having a gap therein, a portion of the gap being provided with outwardly converging walls, a key located between the walls, and a spring to press the key outwardly, the remainder of the gap being enlarged, a block located in the enlarged portion thereof, and a spring to press the block toward the key.

6. A sealing device comprising a split expansible sealing ring having a gap therein, a portion of the gap being provided with outwardly converging walls, a key located between the walls, and a spring to press the key outwardly, the remainder of the gap being enlarged, a block located in the enlarged portion thereof, and a spring to press the block outwardly and toward the key.

7. A sealing ring comprising a split expansible ring member, the ends whereof are spaced apart to form a gap, the walls of the gap converging for a portion of the depth of the ring and undercut for the balance of the ring, a key seated between the converging walls, a spring to force the key outwardly, a block filling the balance of the gap, and a spring to press the block axially of the ring.

SAMUEL B. SMITH.